INVENTOR.
LAWRENCE N. LEA
BY
ATTORNEY

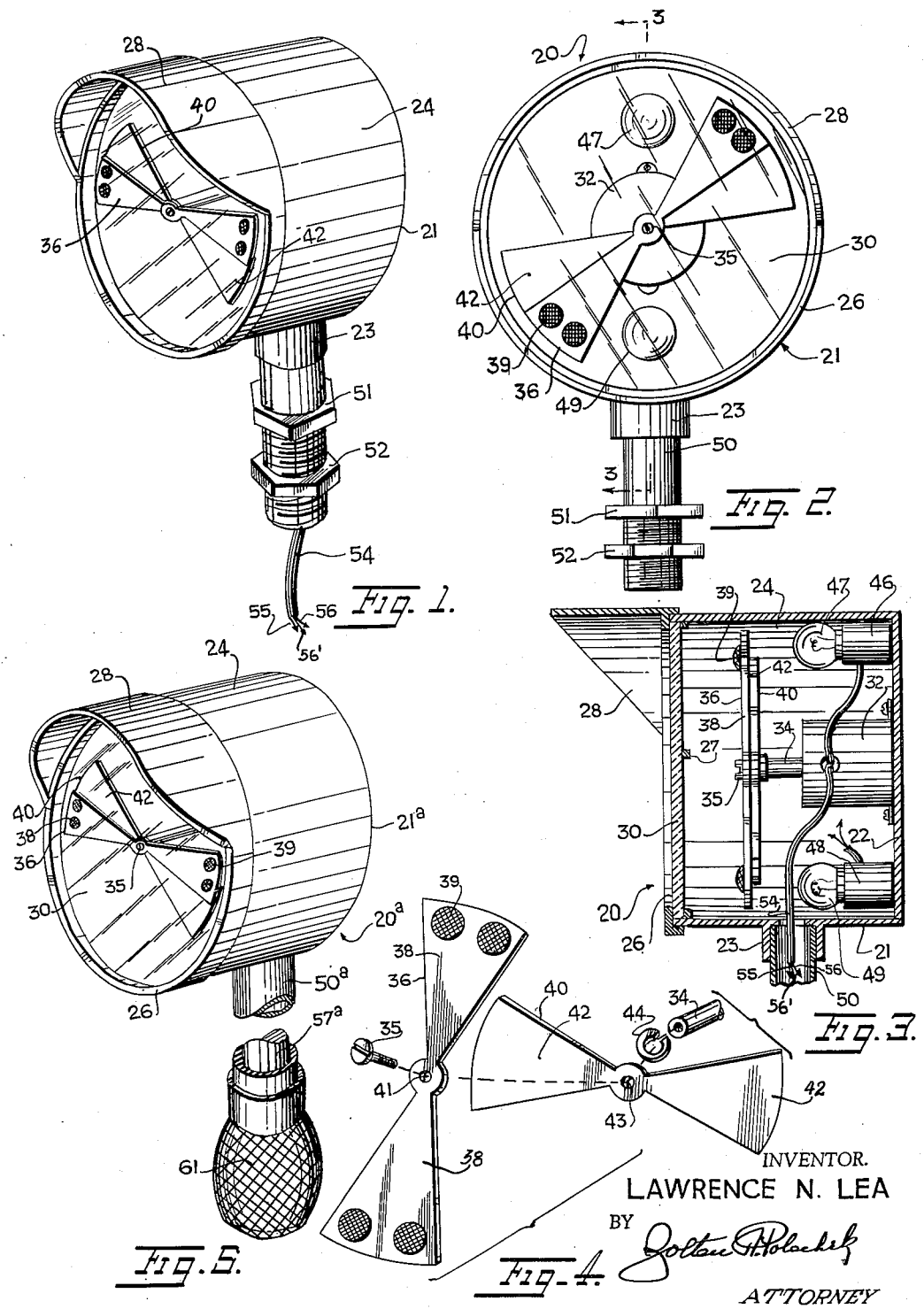

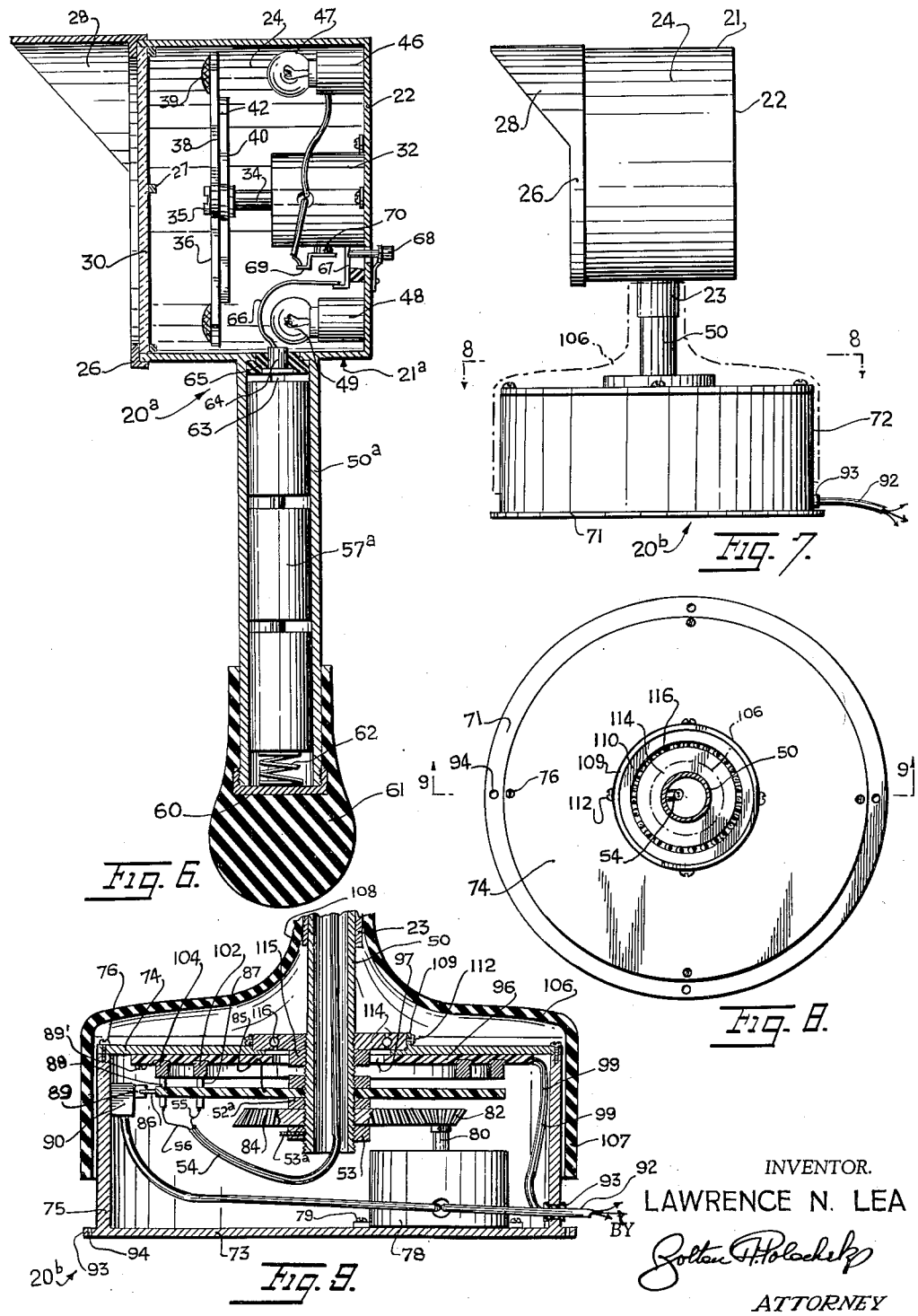

Oct. 24, 1961 L. N. LEA 3,005,975
WARNING, SAFETY STOP AND DISTRESS SIGNALLING LIGHTS DEVICES
Filed Nov. 16, 1959 5 Sheets-Sheet 4
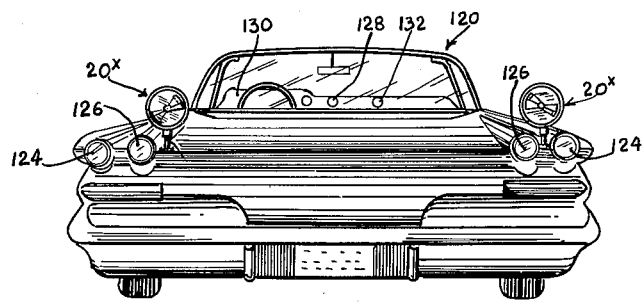
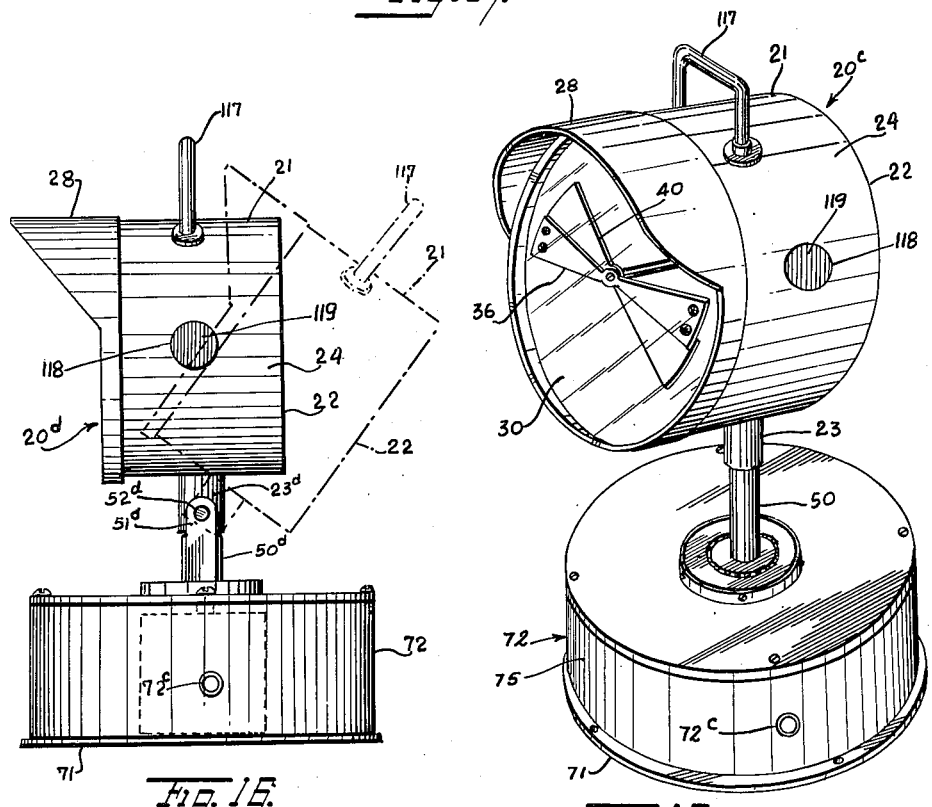
INVENTOR.
LAWRENCE N. LEA
BY
*ATTORNEY*

Oct. 24, 1961 L. N. LEA 3,005,975
WARNING, SAFETY STOP AND DISTRESS SIGNALLING LIGHTS DEVICES
Filed Nov. 16, 1959 5 Sheets-Sheet 5

INVENTOR.
LAWRENCE N. LEA
BY
ATTORNEY

United States Patent Office 3,005,975
Patented Oct. 24, 1961

3,005,975
WARNING, SAFETY STOP AND DISTRESS SIGNALLING LIGHTS DEVICES
Lawrence N. Lea, 1683 University Ave., Bronx, N.Y.
Filed Nov. 16, 1959, Ser. No. 853,054
2 Claims. (Cl. 340—81)

This invention relates to the art of signaling devices and particularly concerns a warning lamp capable of emitting interrupted light signals, such as shown in my patent Number 2,960,680.

According to one embodiment of the invention there is provided a portable device including a casing or housing in which is mounted one or more lamps and a rotatable vane located in front of the lamps for periodically covering the lamps to provide a varying or interrupted light. The housing is provided with a handle in which are disposed batteries for energizing the lamps as well as a motor which drives the rotatable vane. This form of the invention is especially adapted for use by campers, hikers, scouts, hunters, forest rangers, law enforcement officers, track walkers, etc.

In another embodiment of the invention, the device may be connected with a storage battery or other power supply carried by a vehicle.

Inasmuch as there is black in the color red, an amber lens is provided for better perception at a greater distance. A blue lens is to be provided on vehicles used by volunteer firemen to identify them as such, said light to be mounted on the forward end of the vehicles used by firemen.

In still another embodiment of the invention, an oscillating device is provided with means for rotating the housing through 360° in one direction and then reversing to rotate the housing in the opposite direction through 360°. The housing will rotate through a full turn alternately in one direction and then the other. Meanwhile the device will emit an interrupted light as the housing rotates. This form of the device is especially designed for distress signaling for watercraft such as fishing boats, sightseeing boats, cabin cruisers, pleasure boats of all types, etc. The device is to be mounted forward, aft, port and starboard and is to be used during poor visibility due to snow, rain, fog and the like. The method now in use when a vessel or lifeboat is in distress is to shoot up red flares with a hope that in the few seconds that the flare is aloft, it will be spotted by a ship or plane. After the flare drops into the water it extinguishes itself and if by some miracle, the flare is spotted, it is almost impossible to pinpoint the spot from which the flare was fired, particularly at night or in fog. My invention will avoid this by providing a constant lifesaving beacon to guide the rescuers.

It is therefore a principal object of the invention to provide a warning signal lamp capable of emitting a periodically interrupted colored light.

It is another object to provide a lamp of the character described with a housing capable of being oscillated through 360° alternately in one direction and then an opposite direction.

A further object is to provide a periodically interrupted lamp with a shutter assembly including a rotatable vane having associated therewith a blade for adjusting the angular width of the vane.

A still further object is to provide a warning signal lamp which is manually portable and which includes a self-contained power supply, the lamp including interrupted light emitting means.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of one device embodying the invention.

FIG. 2 is a front elevational view of the device of FIG. 1.

FIG. 3 is a sectional view taken on line 3—3 of FIG. 2.

FIG. 4 is an exploded perspective view of components of a shutter assembly employed in the device.

FIG. 5 is a perspective view of another device according to the invention, a portion of the handle of the device being broken away.

FIG. 6 is a longitudinal sectional view of the device of FIG. 5.

FIG. 7 is a side elevational view of still another device embodying the invention.

FIG. 8 is a sectional plan view taken on line 8—8 of FIG. 7.

FIG. 9 is a fragmentary sectional view taken on line 9—9 of FIG. 8.

FIG. 15 is a perspective view of a signaling device embodying another modified form of the invention.

FIG. 16 is a side elevational view of a signaling device embodying still another modified form of the invention, the lamp casing being shown in tilted position in dot-dash lines.

FIG. 17 is a rear end view of a motor vehicle to which the signaling devices embodying the invention have been applied.

Figure 10:
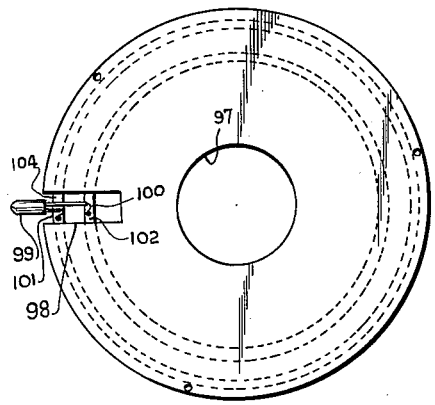
FIGS. 10 and 11 are plan views of contact disks employed in the device of FIGS. 7–9.

Referring to FIGS. 1–4, there is shown a signaling device 20 including a cylindrical casing or housing 21 having a closed circular rear wall 22, an open front end, and a cylindrical side wall 24. Secured on the front end of wall 24 is an annular ring 26 formed with a forward curved projection 28 defining a hood or visor for the open front of the device. The hood or visor is to keep out extraneous light and as a protective shield from snow and rain. Secured in the front end of the housing between lugs 27 and ring 26 is a lens or plate 30 preferably formed of colored transparent glass or plastic material. Mounted on the rear wall 22 is a motor 32 having a shaft 34 on the end of which is secured by a screw 35 a vane 36 having two approximately triangular blades 38; see FIG. 4.

Mounted behind and adjacent to the vane 36 is another similar vane 40 having blades 42. The vanes have registering holes 41, 43 through which extends the shank of screw 35. A lockwasher 44 is also disposed on the screw 35. When the screw is tightened, the two vanes 36, 40 are locked together in desired angular positions. If the blades 38 and 40 are overlapped, then the two vanes constitute a single shutter member. The extent of overlap can be adjusted to obtain a shutter of desired angular width. If the blades 38 and 40 are separated angularly, then the shutter will have four blades. If the blades 38 and 40 are overlapped, then the shutter will have two blades as shown in FIGS. 1 and 2. Reflector jewels 39 may be provided on the blade 38. These jewels are optional.

Two lamp holders 46 and 48 are carried on the end wall 22. Lamp bulbs 47, 49 are removably mounted in the lamp holders. When the lamps are lit and the shutter assembly is rotated, an interrupted light is emitted from the device which is visible at a considerable distance to serve as a warning or distress signal. The lamp holders and lamps may, however, be mounted on the sides of the casing if desired.

Extending radially from the housing 21 is a nipple 23 in which is secured a pipe 50 having a threaded end on which are two nuts 51, 52. The device can be removably attached to a suitable support on the front, rear or side of a vehicle by means of the nuts and threaded pipe. An electrical cable 54 passes through the pipe 50 and is connected to the lamps and motor in the housing.

Figure 12:
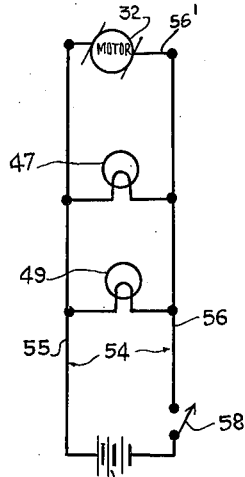
FIGS. 12, 13 and 14 are diagrams of electrical circuits employed in the several forms of the invention.
Figure 11:
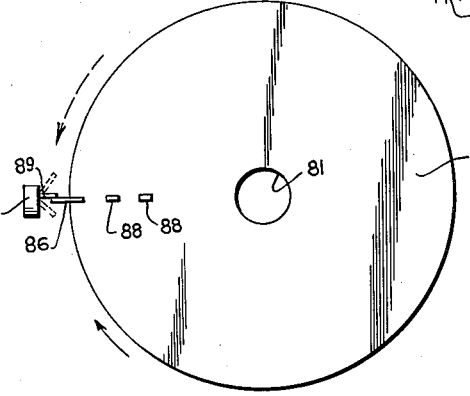

Referring to FIG. 12 it will be noted that the lamps 47, 49 and motor 32 are connected in parallel to conductors 55, 56 of the cable 54. Conductor 55 terminates at a battery 57 which may be the power supply for the electrical system of the vehicle on which the device is mounted. In series with the battery and conductor 56 is a switch 58 which is preferably located in any place convenient to the driver or operator of the vehicle. When the switch is closed, the lamps 47 and 49 will light and the motor will be energized to rotate the shutter and cause the interrupted warning light to be emitted as the shutter blades pass cyclically in front of the lamps 47, 49.

Figure 13:
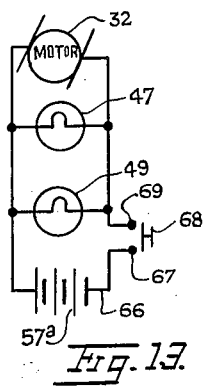

In the form of the invention illustrated in FIGS. 5, 6 and 13, there is provided a manually portable device 20ª embodying the invention. Housing 21ª is provided with a pipe 50ª of enlarged diameter in which is disposed a plurality of batteries 57ª. The lower threaded end of the pipe is closed by a removable cap 60. A rubber knob 61 is provided to serve as a convenient carrying handle. A spring 62 is disposed between the cap and lowermost battery. The batteries are arranged in series. The positive terminals 63 of the uppermost battery is pressed against a metal stud 64 which is seated in an insulator plug 65 at the top of the pipe. A wire 66 extends from stud 64 to a contact 67. This contact has a flexible tip which can be moved by an insulated button 68 carried on a spring 59. Contact 67 is spaced from but can be moved to contact a fixed contact 69 carried by the motor on an insulated spacer 70. Contacts 67 and 69 constitute a switch as shown in FIG. 13 for selectively energizing and deenergizing motor 32 and lamps 47, 49 which are connected in parallel with the batteries 57ª via the switch 67—69. The shutter assembly and lamps are arranged in the same manner as for the device 20. Corresponding parts of the devices 20 and 20ª are identically numbered.

In the form of the device 20ᵇ shown in FIGS. 7–11 and 14, the housing 21, pipe structure 50 and the components therein are identical with those of the device 20. There is additionally provided a means for oscillating the housing through 360° cyclically in one direction and then in the opposite direction. To accomplish this purpose there is provided a cylindrical base 72 having a closed circular bottom 73 and a removable closed top cover plate 74 removably held on the cylindrical wall 75 of the base by screws 76. A motor 78 is secured to the bottom wall 73 by screws 79. The shaft 80 of the motor carries a gear 82 which meshes with a ring gear 84. Gear 84 is held on the threaded lower end of shaft 50 by a nut 52ª above the gear and another nut 53 below the gear. A setscrew 53ª is provided to secure the nut 53 against loosening. Between an upper nut 51ª and nut 52ª is a disk 85 made of insulation material. This disk has a central hole 81 as clearly shown in FIG. 11. Radially extending from the disk 85 is a spring finger 86. Extending upwardly from the disk are two spaced spring contact fingers 87 and 88. Finger 86 is disposed to contact an operating arm 89 of a microswitch 90 mounted on the cylindrical wall 75 of the base. The switch 90 is in circuit with motor 78. Cable 92 passes through a grommet 93 in an opening in wall 75 from a suitable energizing power source.

The bottom wall 73 has an annular flange 71 provided with holes 94 to receive screws or bolts for attaching the device to a suitable support (see FIG. 8). Secured to the cover plate 74 by screws 89 is a flat circular insulation disk 96 having a central hole 97 as best shown in FIGS. 9 and 10. This disk has a radial slot 98 through which passes a cable 99 (see FIG. 10). The conductor wires 100 and 101 of the cable are soldered to exposed portions of two concentrically disposed conductive rings 102 and 104 secured to the underside of the insulation disk 96. The rings are radially spaced so that one spring finger 87 wipes one ring 102 and the other finger 88 wipes the other ring 104 as the disk 85 rotates with pipe 50 and housing 21. Cable 54 has its wires 55, 56 connected to the individual contact fingers 87, 88 which extend through the disk, and its wire 56′ connected to motor 32.

In order to render the device waterproof, housing 21 is closed. Only the lower end of pipe 50 is open to permit passage of cable 54 therethrough as best shown in FIG. 9. A rubber apron 106 can be mounted on the device to render the base 72 waterproof, as best shown in FIG. 9 and shown in dotted lines in FIG. 7. The sleeve 23 in which the pipe 50 is seated is encircled and engaged by the neck 108 of the apron. The apron rotates with the housing 21 and pipe 50. The apron has a lower flaring cylindrical portion or skirt 107 which surrounds the base and serves to prevent water from entering the base.

The cover plate 74 is formed with an annular upstanding flange 109 in which is seated an outer bearing race 110 secured by screws 112. An inner bearing race 114 is threaded on the pipe 50. Ball bearings 116 insure a freely rotatable joint between the rotating housing 21 and the stationary base 72. A nut 115 secures the race 114 on the pipe.

Figure 14:
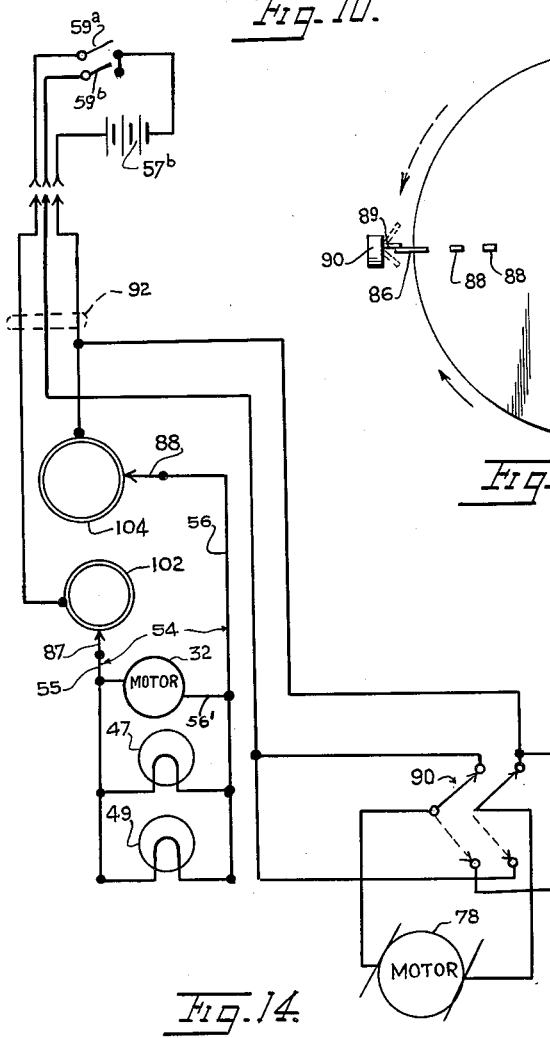

Referring to the circuit diagram of FIG. 14, it will be noted that microswitch 90 is arranged as a double-pole double-throw switch which reverses the polarity of power supplied to motor 78. The switch is thrown to one position or another at the end of each full 360° rotation of the finger 86 on disk 85. The lamps 47 and 49 are arranged in parallel with motor 32. As shown in the drawing, one wire 55 is connected to one wiper finger 87 and the other wire 56 is connected to the other wiper finger 88. Fingers 87, 88 contact rings 102, 104, respectively. A third wire 56′ is connected to motor 32. Power is supplied via cable 92 which terminates at a battery 57ᵇ in series with a remote switch 59ª. The switch 59ª permits all the lamps to be controllably energized and deenergized. Another switch 59ᵇ controls the oscillator.

In operation of the device 20ᵇ, the motors 32 and 78 are energized along with lamps 47, 49 when the switch 59ª is closed. The motor 78 drives the housing 21 via shaft 80, gears 82 and 84 first in one direction until contact finger 86 engages the operating arm 89 of the switch 90 to reverse the switch. This reverses the direction of rotation of motor 78 and of housing 21. Meanwhile the contact fingers 87, 88 continuously wipe the rings 102, 104 to energize the cable 54. This cable conducts power to the lamps 47, 49 and motor 32. The shutter assembly driven by the motor (see FIGS. 1–4) continuously rotates and a colored interrupted light is thus emitted by the device.

In order to equip a boat with the several forms of the device described, one of the devices 20 may be located at the forward end of the boat and one may be located aft. An oscillating signal lamp 20ᵇ as described above may be mounted on the highest point of the ship, such as the upper end of the main mast, radio tower, etc. The forward and aft lights may be red. The oscillating light may be any desired color. In addition, a portable warning signal lamp 20ª as described above may be provided as equipment for a lifeboat or raft. The device 20ª with its self-contained power supply is especially useful for emergency purposes and is wholly manually controllable.

The modified form of signaling device 20ᶜ shown in FIG. 15 differs from the form of signaling device 20ᵇ of FIG. 7 in that an inverted U-shaped handle 117 is mounted on the casing 21 to facilitate transportation of the device. In this form also a window 118 with colored lens 119 is provided at opposed points in the side wall 24. A socket opening 72ᶜ is also formed in the side wall 75 of the base 72 to receive a jack or the like for activating the signal light by a hand-operated magneto or the like so as to provide a constant lifesaving beacon.

In FIG. 16 another modified signaling device 20ᵈ is shown which is similar to the signaling device 20ᶜ of FIG. 15 except that the casing 21 and base 72 are pivotally connected. This pivotal connection consists of perforated ears 51ᵈ extending from opposed points on the top of the pipe 50ᵈ and pivot pins 52ᵈ having one end loosely mounted in the perforations in said ears and having the other end fitted in socketed holes in the nipple 23ᵈ. By reason of this construction, the casing 21 may be tilted fore and aft as shown in dot-dash lines.

Figure 18:
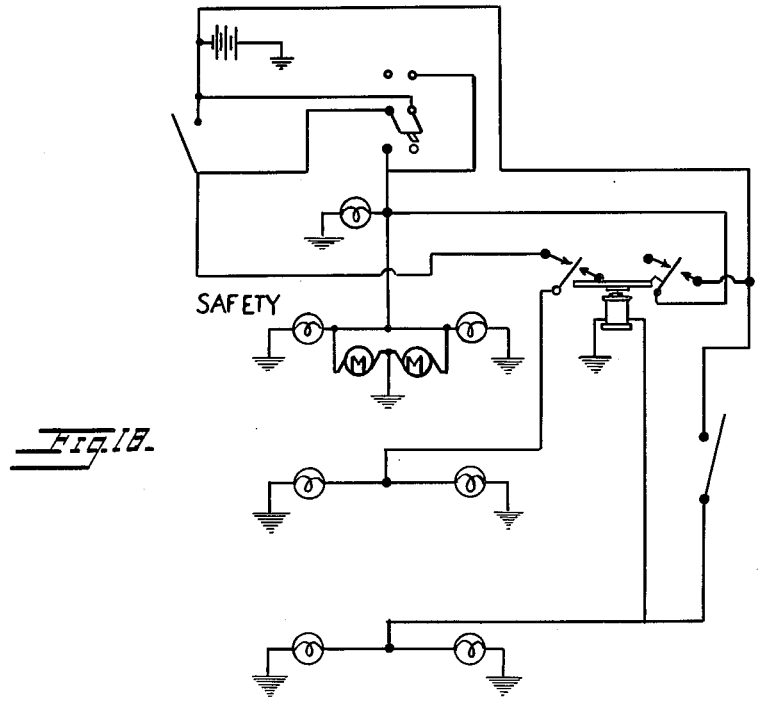
FIG. 18 is a wiring diagram of the electrical circuit employed in a motor vehicle embodying my invention.
Figure 19:
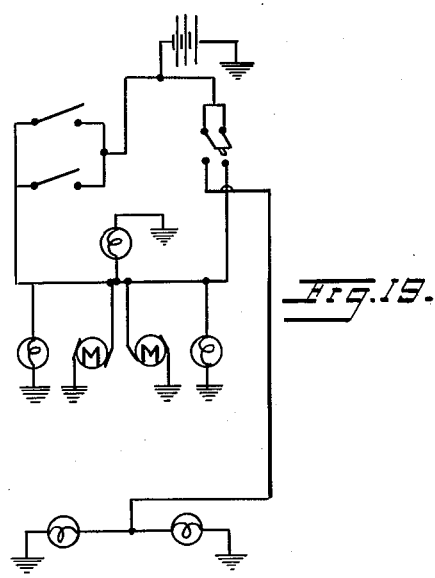
FIG. 19 is a wiring diagram of the electrical circuit used on motor vehicles during a stage in the manufacture thereof.

In FIGS. 17 to 19, inclusive, the signaling device indicated generally at 20ˣ is shown applied to a motor vehicle 120. In this use of the signaling device, it is energized by the vehicle's storage battery 122. A signaling device 20ˣ is mounted at the rear of the vehicle at each side thereof. The signaling device 20ˣ will be referred to as the "safety lamp" hereinafter in order to distinguish it from the stop light lamps and back-up light lamps which are included in the present signal light systems. It is also advisable to have on the dashboard a pilot lamp which lights up while the safety lamp is lit.

In existing vehicles, there are already the stop signal lamps 124 and the back-up signal lamps 126. Said lamps 124 are actuated upon an effective shift of the foot brake while the lamps 126 are actuated upon shift of the drive into reverse; said brake and reversing mechanism of the motor vehicle not being shown.

It is evident that upon operation of the motors 32, 32 and the electric lamps 47 and 49 of the safety lamps, the action of the vanes 36, 40 will be to progressively diminish the illumination intensity observed through the lenses 30, 30 and then to progressively increase such intensity to maximum. This acts to alert vehicle drivers and pedestrains positioned rearward of the vehicle, the speed of said motors 32, 32 being relatively slow. When the vanes 36 and 40 are used, there occurs both a gradual illumination intensity viewable accompanied by a rather sharp change per revolution of the vane unit.

In signal systems now in use, a switch 123 (FIG. 16) operated to close upon working the foot brake of the vehicle, causes the actuation of the stop signal lamps 124, and a switch 125, operated to close upon shifting of the drive mechanism into reverse, causes the actuation of the back-up lamps 126. As shown in FIG. 15, I have added to such system the safety signal lamps 20ˣ, an optional pilot lamp 128 mounted on the dashboard 130, the switch 132 which is also mounted on the dashboard and the electrical relay device indicated generally by the numeral 134, which may be mounted under the hood or other convenient place on the vehicle. It will be shown that all connections to said added components are easily made. It might here be noted that in the original system heretofore existing, the conductor 136 was one with the conductor indicated by the numeral 138 and, of course, the components 47, 49, 128, 132 and 134 were absent. The previously existing electrical system as now modified by me and illustrated in FIG. 15, will now be described.

One terminal of the storage battery 122, one terminal of all electric signal lamps 47, 49, 124, 126, 128, one terminal of each of the motors 32, 32 and one terminal of the electromagnet 140 of the relay 134, are all grounded to the frame of the vehicle 120. For the switch 132, I use one of the double-pole, double-throw type, but in reality, I employ it as two single-pole, single-throw switches; one being in closed condition when the other is open, or both are in open condition. The relay device 134 comprises the electromagnet 140, whose armature 142 is on an insulating element 144, carrying the shiftable conductive switch elements 146 and 148 which are moved by armature travel.

Switch element 146 is normally in contact with the fixed contact point 150, but upon actuation of the electromagnet 140, said element 146 moves away from the contact point 150 and makes contact with the fixed contact point 152. The switch element 148 is normally in contact with the fixed contact point 154, but upon actuation of said electromagnet 140, said element 148 moves away from the fixed contact point 154 and makes contact with the fixed contact point 156. The other terminals of the lamps 20ˣ and 128 are electrically connected to the switch element 148. The other terminals of the lamps 124 are electrically connected to the switch element 146. The other terminals of the lamps 126 and the other terminal of the electromagnet 140 are all electrically connected to one terminal of the back-up switch 125. The other terminal of said back-up switch 125, the contact point 156 and one terminal of the brake switch 123 as well as one blade of the switch 154, are all electrically connected to the other terminal of the battery 122. The other terminal of said brake switch 123, the other blade 158 of the switch 132 and the contact point 150 are all electrically connected. Contact terminal 160 of the switch 132 is electrically connected to its diagonally opposite terminal of the switch 132 and also to the ungrounded terminals of the lamps 47, 49, 128.

In normal use condition, the brake switch 123 and the back-up switch 125 are open and the switch 132 is set so that blade 158 contacts the terminal 160. All the signal lamps 20ˣ, 124, 126, 128 are unlit and the motors 32, 32 are still. The armature 142 is away from the electromagnet 140. The switch element 146 is in contact with the contact point 150, and the switch element 148 is in contact with the contact point 156. It may here be noted that since there are no connections to the contact points 152 and 154, the relay device 134 really comprises two single-pole single-throw switches, one of which is closed while the other is open; the elements 146 and 150 constituting one such switch and the elements 148 and 156 constituting the other of said switches.

Upon operation of the foot brake of the vehicle, switch 123 will close. Thereupon, the lamps 47 and 49 of the safety signal devices 20ˣ will light up as well as the lamp 128, and the motors 32, 32 will operate. Also, the stop signal lamps 124 will be lit. Evidently, upon the opening of the brake switch 123, the apparatus will assume normal rest condition.

On operation of the reversing mechanism of the vehicle, the back-up switch 125 will close. Thereupon, the back-up signal lamps will become lit. Also, the electromagnet 140 will be actuated, thereby causing element 148 to move into contact with point 156, and simultaneously causing element 146 to move away from point 150. Hence, the stop signal lamps 124 will remain unlit but the safety signal lamps 47, 49, the pilot lamp 128 and the back-up signal lamps 126 will light up and, of course, the motors 32, 32 will operate. It is evident that upon the opening of the back-up switch 125, the apparatus will assume normal rest condition.

Upon shifting the blades of the switch 132 to their upward setting in FIG. 5, the safety signal lamps 47, 49 their motors 32, 32 and the pilot lamp 128 will be actuated and continue so as long as said switch 132 remains in its upward setting. This is used as a distress signal calling for help while the vehicle is either in motion, or stalled or parked, due to breakdown or for any other reason. It is also advisable to use this while traveling in fog or when rain is heavy or when driving is hazardous is when roads are slippery, to signal caution to drivers behind.

I may mention here that the glass lens 30 of the safety signal devices 20ˣ, may be red in color, and better yet, their color should be amber, which has the property of greater visibility generally and in fog particularly. Also, the compelling alertness imposed on viewers of the operating safety signal means 20ˣ must be appreciated as a significant factor which would materially reduce accidents on the road.

In new vehicles to be manufactured, the system shown in FIG. 17 may be employed. Here, the stop signal lamps 124 are omitted, because the safety signal lamps now designated as 20ˣ, are made to serve in their stead. In so doing, the system has been materially simplified, by consisting of said lamps 20ˣ and their associated motors 32, 32, the pilot lamp 162, the brake switch 164, the back-up signal lamps 166, the battery 168, an emergency single-pole single-throw switch 170 and a double-pole single-throw back-up switch 172.

One of the terminals of each of the lamps 166, 20ˣ, 162 and one terminal of the battery 168 are grounded to the frame of the vehicle. The blades of the switch 172 are electrically connected to the other terminal of the battery 168 and to one terminal of each of the switches 170 and 164. The other terminals of said switches 170, 164 and one of the other terminals 174 of the switch 172, are all electrically connected with the other terminals of the lamps 20ˣ, 162 and with the other terminals of the motors 32, 32. The remaining terminal of the switch 172 is electrically connected with the other terminals of the lamps 166.

In normal rest condition, all switches are open in this system of FIG. 17. Upon operation of the foot brake of the vehicle, switch 164 is closed, whereupon the lamps 20ˣ and 162 and the motors 32, 32 will be actuated. Upon the opening of said switch 164, normal rest condition is restored. Upon operation of the reversing mechanism of the vehicle, the switch 172 will assume closed condition, whereupon all lamps and motors will be operated. For a distress signal, the operator closes the switch 170, whereupon the safety signal lamps 20ˣ, the pilot lamp 162 and the motors 32, 32 will be in continuous operation until said switch 170 is opened.

In new vehicles to be manufactured, the installation of the signaling system shown in FIG. 17 is simple and economical. In present vehicles, conversion to the system shown in FIG. 16 is also easily made, by for instance, mounting the switch 132 and the pilot lamp 128 on the dashboard 130 and installing the safety signal devices 20ˣ at suitable places at the rear of the vehicle structure. In vehicles where there is an accessible space behind the dashboard, the relay device 134 may be mounted there, otherwise on framework which is covered by the hood or the trunk compartment if there is one. Connections of the added apparatus to the apparatus existing are easily accomplished either at the terminals of the brake switch 123 and the back-up switch 125, or else to conductors along the vehicle structure leading to said switches. Several of the required conductors to which connections are to be made are accessible at the rear of the vehicle, where they come to the stop signal lamps 124 and the back-up signal lamps 126.

The function of this form of my invention is to instantaneously alert oncoming vehicles that the car ahead is either stopping, stopped or disabled, or otherwise not moving with the normal flow of traffic. Its use on a fog-bound highway is a lifesaving signaling beacon. Also, my invention has the ability to act as an awakening device for drowsy motorists. Hundreds of lives are lost by the monotony of long hours of highway driving. The rotating action of the amber lights, keeps the driver alert and thus makes him aware of any impending highway hazards.

Many people are killed or injured while attempting to change a flat tire on a busy highway. However, with the use of my invention, the motorist may now flip on the manual switch 132 located on his dashboard, to warn oncoming vehicles that he is in distress and should use caution in approaching and passing. As we all know, whenever a motorist is in distress he will usually tie a white cloth or a suitable substitute therefor to his antenna in order to signal to receive aid. Naturally, this has little or no effect on oncoming motorists during the evening hours. With my invention, the motorist will be able to simply flip on said manual switch on his dashboard, to signal oncoming vehicles that he is in distress and needs aid.

It is evident that my invention is designed to save lives, reduce injuries and eliminate hundreds of thousands of dollars in property damage and insurance claims by greatly cutting down the causes of one vehicle smashing into the rear of the vehicle or vehicles ahead of him. At present, the only means a motorist has of knowing that the vehicle or vehicles ahead are not moving in a normal flow of traffic, is a myriad of bright and dull red lights which seem the same whether the vehicles ahead have stopped or are moving. Also, during daylight hours, the reflection of the sun on the rear lights of the car ahead, deflects or neutralizes said lights. With my invention, when a car has stopped or is in the process of stopping or is backing up or is disabled, it is easily discernible and immediately alerts the driver behind, because of the arresting action of my new signal system.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A warning signal device comprising a generally cylindrical housing having an open front end and a closed rear wall, a transparent colored lens mounted at said front end, a hood disposed over said open front end to shade said lens from extraneous light, a motor mounted in said housing, said motor having a forwardly extending shaft, a pair of vanes mounted on said shaft and angularly adjustable with respect to each other, at least one lamp mounted in said housing between said rear wall and said vanes so that the vanes cyclically interrupt light beams emitted by the lamp through said lens, a support for the housing extending radially therefrom, said support being a pipe, a power supply cable extending through said pipe and connected to said lamp and motor, and means for oscillating said housing and pipe alternately in one direction and in an opposite direction through 360° at a time, said means comprising a base, said pipe being rotatably supported on said base, motor means operatively connected to said pipe for driving the same, reversing switch means in circuit with said motor, and a power source in circuit with said switch means and motor means for energizing said motor means, said reversing switch means including a double-pole double-throw reversing switch carried by said base, said switch having an operating arm, a disk carried by said pipe, and an operating finger carried by said disk and disposed to operate said arm at the end of each full turn of the disk, pipe and housing through 360° of angular rotation, said disk carrying a pair of contact elements, another disk carried by said base, and a pair of ring contacts carried by said other disk, said contact elements being disposed to wipe said ring contacts respectively continuously during rotation of the first-named disk, pipe and housing, said power supply cable having wires connected to said contact elements, said power source having wires connected to the ring contacts respectively.

2. A warning signal device comprising a generally cylindrical housing having an open front end and a closed rear wall, a transparent colored lens mounted at said front end, a hood disposed over said open front end to shade said lens from extraneous light, a motor mounted in said housing, said motor having a forwardly extending shaft, a pair of vanes mounted on said shaft and angularly adjustable with respect to each other, at least one lamp mounted in said housing between said rear wall and said vanes so that the vanes cyclically interrupt light beams emitted by the lamp through said lens, a support for the housing extending radially therefrom, said support being a pipe, a power supply cable extending through said pipe and connected to said lamp and motor, and means for oscillating said housing and pipe alternately in one direction and in an opposite direction through 360° at a time, said means comprising a base, said pipe being rotatably supported on said base, motor means operatively connected to said pipe for driving the same, reversing switch means in circuit with said motor, and a power source in circuit with said switch means and motor means for energizing said motor means, said reversing switch means including a double-pole double-throw reversing switch carried by said base, said switch having an operating arm, a disk carried by said pipe, and an operating finger carried by said disk and disposed to operate said arm at the end of each full turn of the disk, pipe and housing through 360° of angular rotation, said disk carrying a pair of contact elements, another disk carried by said base, and a pair of ring contacts carried by said other disk, said contact elements being disposed to wipe said ring contacts respectively continuously during rotation of the first-named disk, pipe and housing, said power supply cable having wires connected to said contact elements, said power source having wires connected to the ring contacts respectively, and an apron over said base for rendering the same waterproof, said apron having a narrow neck and wide skirt, said neck engaging said pipe outside of the base, said skirt surrounding said base, said apron rotating with the pipe and housing.

References Cited in the file of this patent

UNITED STATES PATENTS

| | | |
|---|---|---|
| 448,315 | Berne | Mar 17, 1891 |
| 1,108,822 | Adleta | Aug. 25, 1914 |
| 2,214,473 | Mann | Sept. 10, 1940 |
| 2,266,201 | Heidel | Dec. 16, 1941 |
| 2,510,892 | Kennelly | June 6, 1950 |
| 2,644,152 | Ginsberg | June 30, 1953 |
| 2,960,680 | Lea | Nov. 15, 1960 |